Jan. 14, 1964 V. BONAVERA 3,117,561
ROTOR TYPE POWER GENERATING OR WORK PERFORMING MEANS
Filed Feb. 6, 1961 10 Sheets-Sheet 1
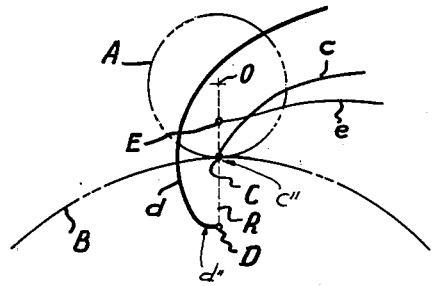
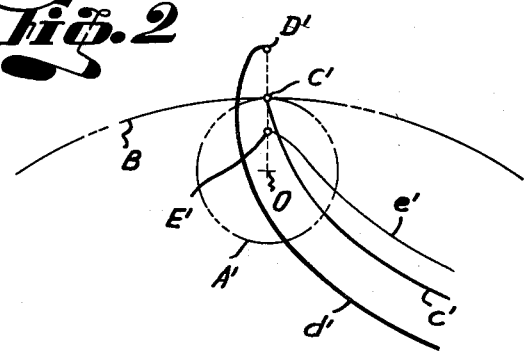
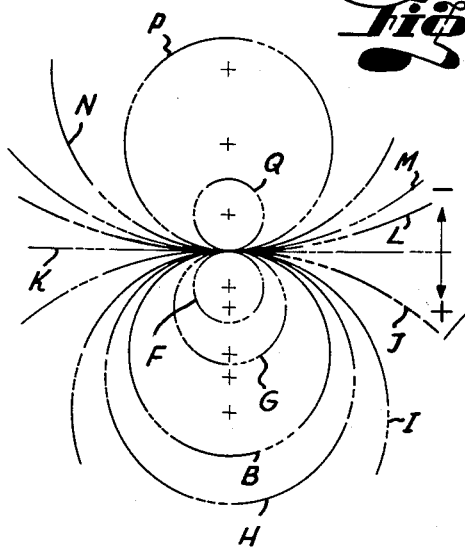
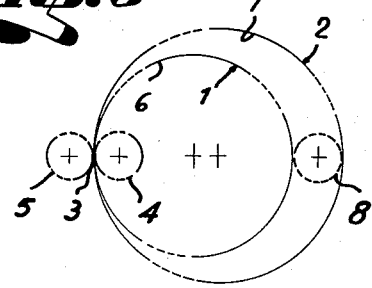
INVENTOR.
Victor Bonavera

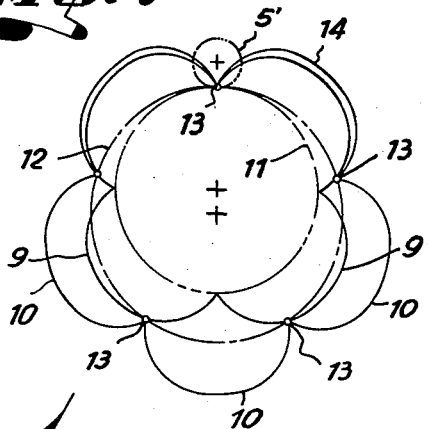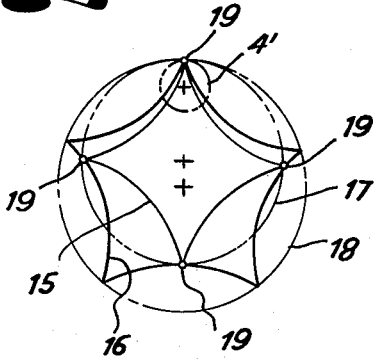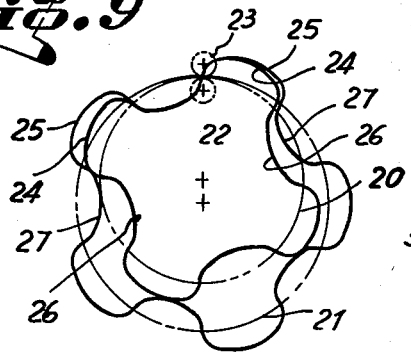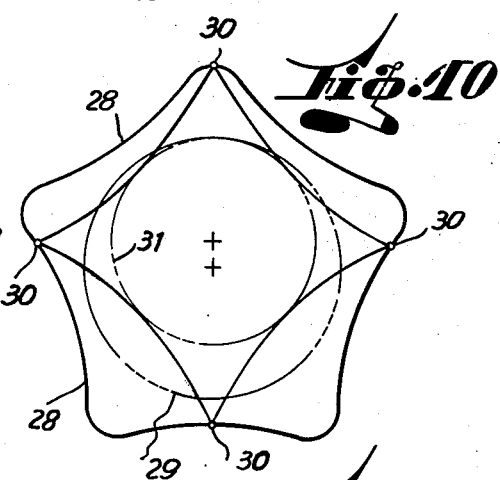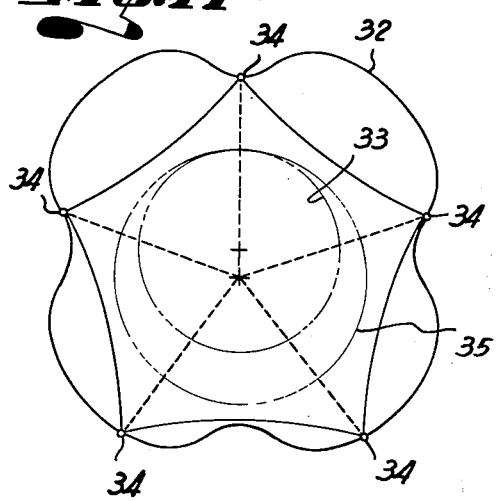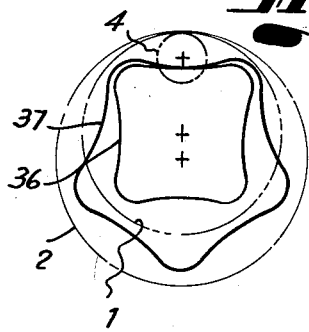

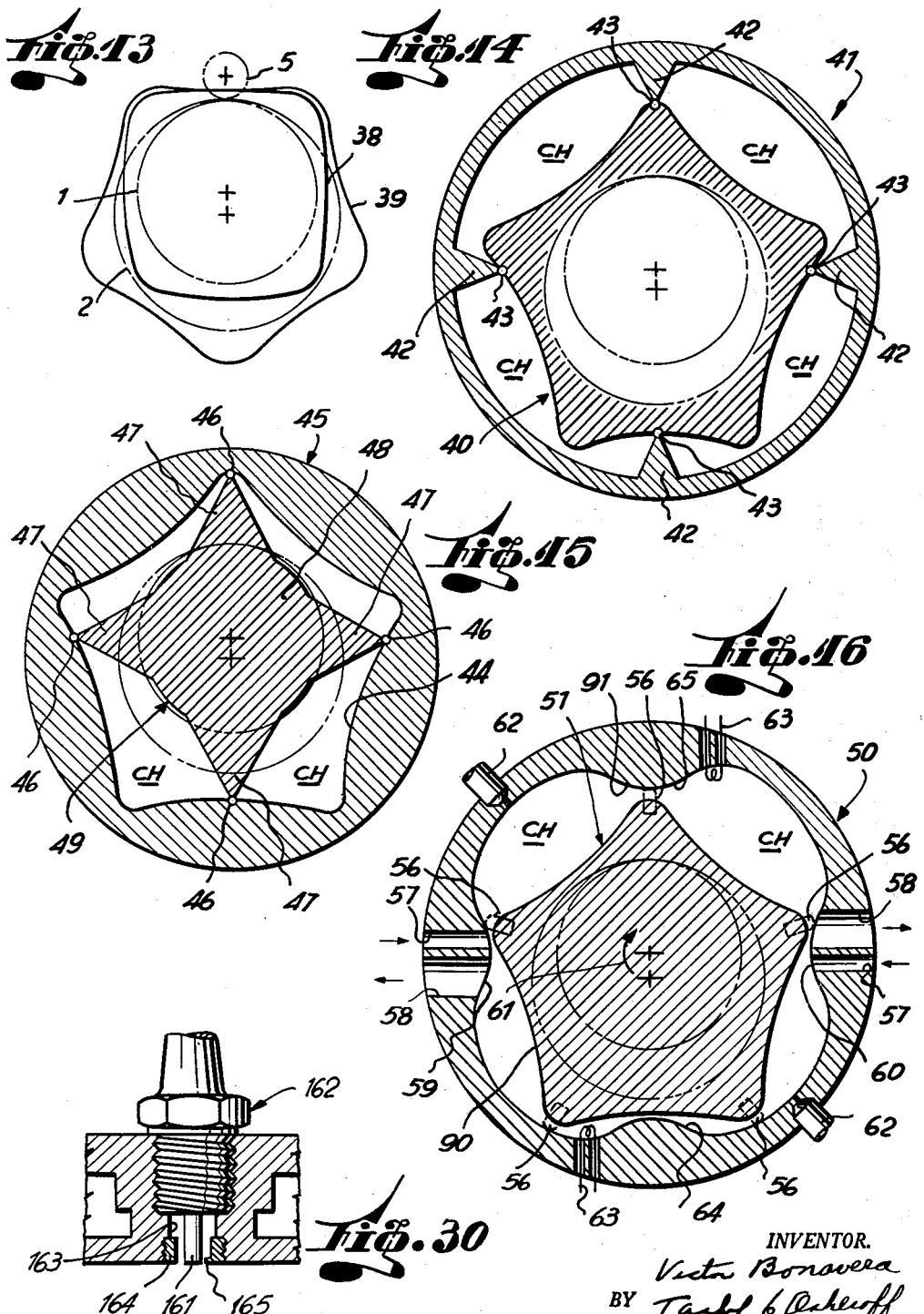

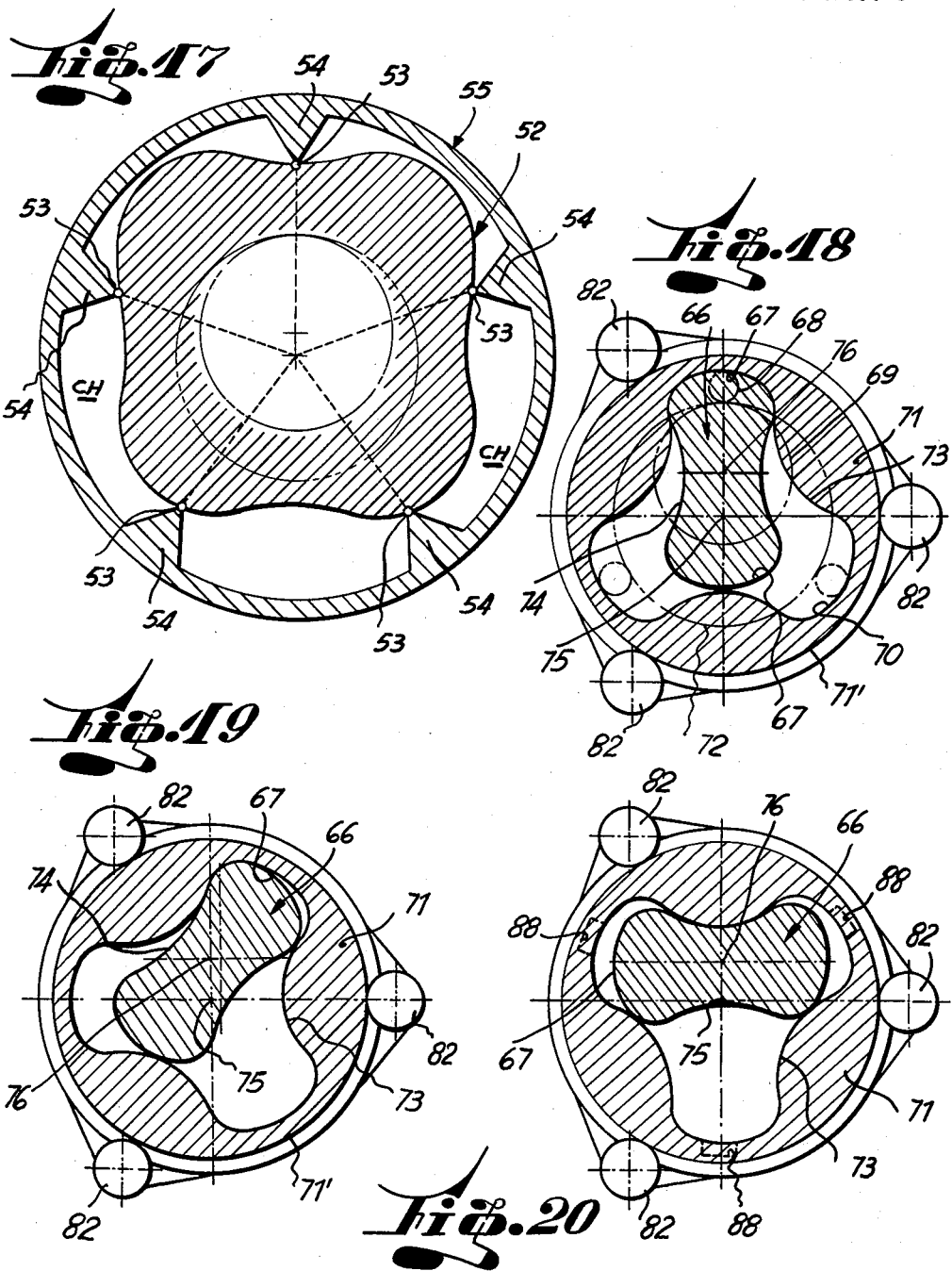

Jan. 14, 1964 V. BONAVERA 3,117,561
ROTOR TYPE POWER GENERATING OR WORK PERFORMING MEANS
Filed Feb. 6, 1961 10 Sheets-Sheet 5
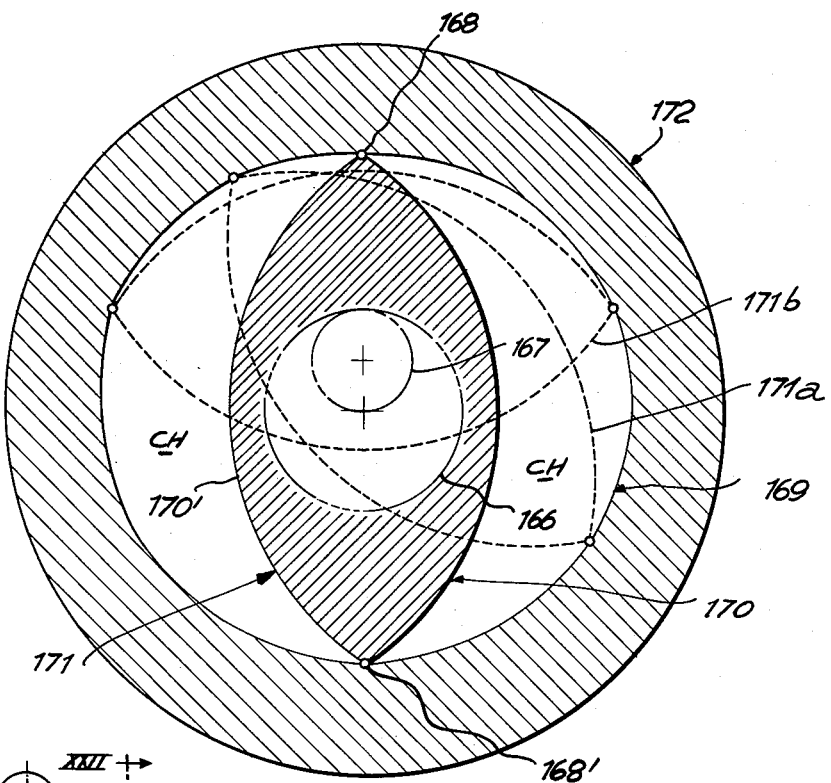
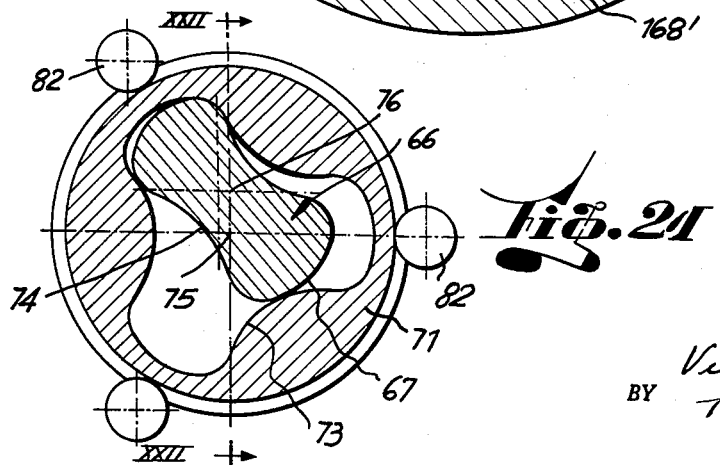
INVENTOR.
Victor Bonavera
BY

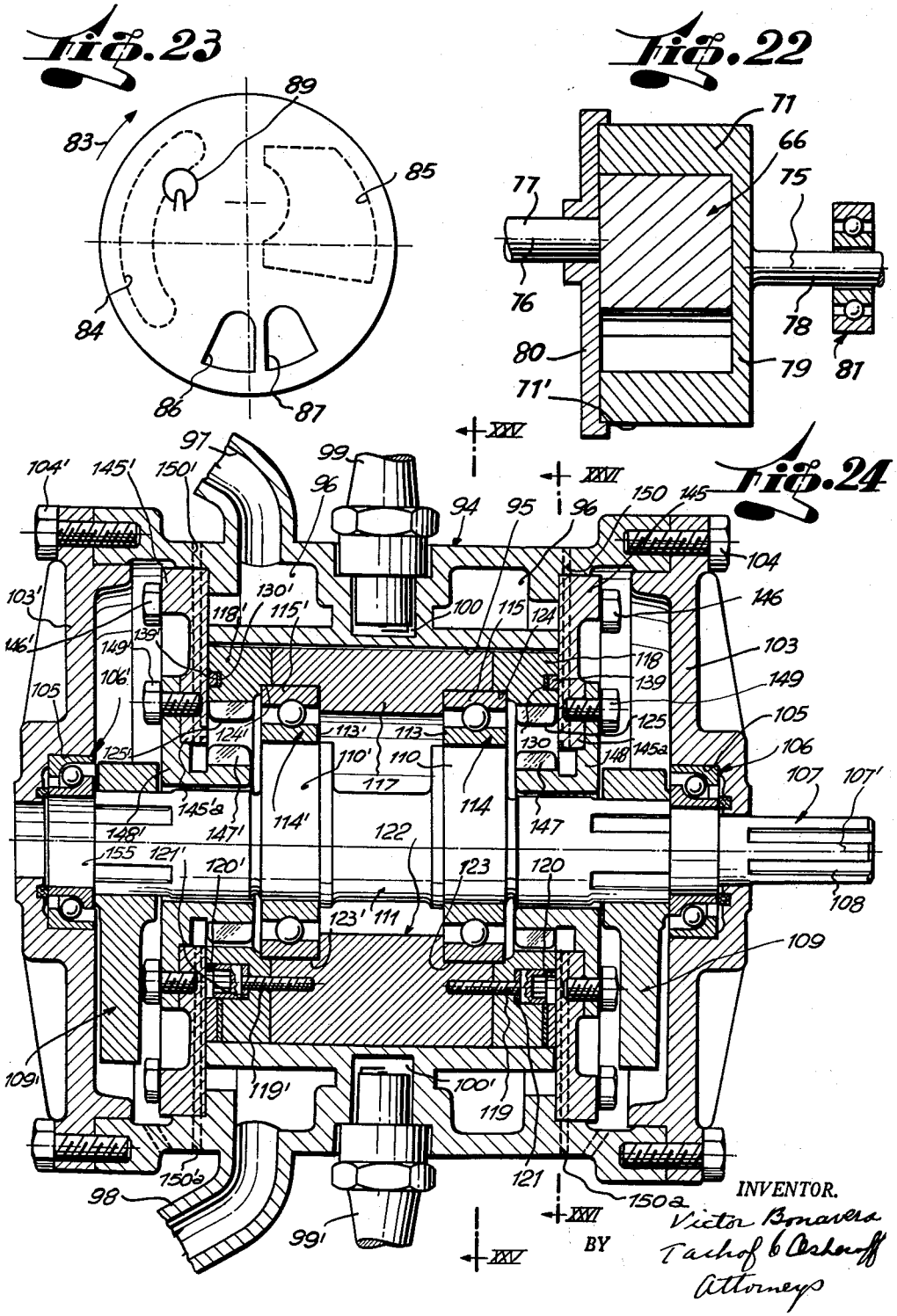

Jan. 14, 1964 V. BONAVERA 3,117,561
ROTOR TYPE POWER GENERATING OR WORK PERFORMING MEANS
Filed Feb. 6, 1961 10 Sheets-Sheet 7

INVENTOR.
Victor Bonavera
BY Tashof & Oekerff
Attorneys

Jan. 14, 1964 V. BONAVERA 3,117,561
ROTOR TYPE POWER GENERATING OR WORK PERFORMING MEANS
Filed Feb. 6, 1961 10 Sheets-Sheet 8

INVENTOR.
Victor Bonavera
BY
Attorney

INVENTOR.
Victor Bonavera
BY Tashof Ackeroff
Attorneys ic Office 3,117,561
Patented Jan. 14, 1964

3,117,561
ROTOR TYPE POWER GENERATING OR WORK
PERFORMING MEANS
Victor Bonavera, 316 Aristobulo del Valle Street,
Martinez, Buenos Aires, Argentina
Filed Feb. 6, 1961, Ser. No. 87,461
Claims priority, application Great Britain Apr. 26, 1960
15 Claims. (Cl. 123—8)

The present invention refers to a rotor type power generating or work performing means and more particularly said rotor type means may operate as a prime-mover, preferably as an engine of the injection and ignition type, a pump or a compressor, depending on small changes in the design and obviously consequent operation, but always using the same basic principle.

The rotor type power generator or work performing means, at least as far as the general discussion of the principle is concerned, will hereinafter be simply called the "machine."

Since it is believed that the principle on which the machine of the present invention is based is as such new, at least as far as the design of the rotary elements and accessories is concerned, it is considered necessary to first analyze the different possibilities of the basic geometric concept, some of which possibiilties can be used in practice and others are not suitable. Since such a discussion will be easier understood in relationship with pertinent drawings it is considered best to first describe the different figures in a succinct way both those referring to the generic discussion, as well as those corresponding to two preferred embodiments.

In the drawings:

FIG. 1 is a schematic lay-out of different epicycloid and epitrochoid curves.

FIG. 2 is a schematic lay-out of different hypocycloid and hypotrochoid curves.

FIG. 3 is a schematic lay-out which enables the explanation of what is to be understood under complementary cycloids.

FIGS. 4 and 5 are respective schematic lay-outs to show the way the complementary cycloids may be generated with regard to the cycloids of FIGS. 1 and 2, respectively.

FIG. 6 is a schematic lay-out of two tangent generating circles restricted to those possibilities where the minimum necessary conditions are fulfilled, in order to be able to build a machine, in accordance with the present invention.

FIG. 7 shows a lay-out of a pair of meshing epicycloids.

FIG. 8 shows a lay-out of a pair of meshing hypocycloids.

FIG. 9 is a lay-out of a pair of meshing wheels of a mixed epicycloid and hypocycloid type.

FIG. 10 is a lay-out of a pair of meshing wheels of the curtate hypotrochoid type.

FIG. 11 is a lay-out of a pair of meshing wheels of the curtate epitrochoid type.

FIG. 12 is a lay-out of a pair of meshing wheels of the prolate hypotrochoid type.

FIG. 13 is a lay-out of a pair of meshing wheels of the prolate epitrochoid type.

FIGS. 14 to 17 are schematical longitudinal sections of ways of designing the inner and outer wheels of the machine, according to the present invention.

FIGS. 18 to 21 each show a schematical longitudinal section of another embodiment of the machine, according to the present invention, in different positions, where both wheels consist of a mixed hypocycloid and epicycloid type, wherein the outer wheel comprises three teeth and the inner wheel or pinion two teeth.

FIG. 22 is a longitudinal section along line XXII—XXII of FIG. 21.

FIG. 23 is a schematical lay-out of the way the inlet and outlet ports have to be arranged in case the machine of FIGS. 18 to 21 operates as a pump or a compressor on one hand or as a prime-mover on the other hand.

FIG. 24 is a longitudinal section of a first preferred structural embodiment.

Figure 25:
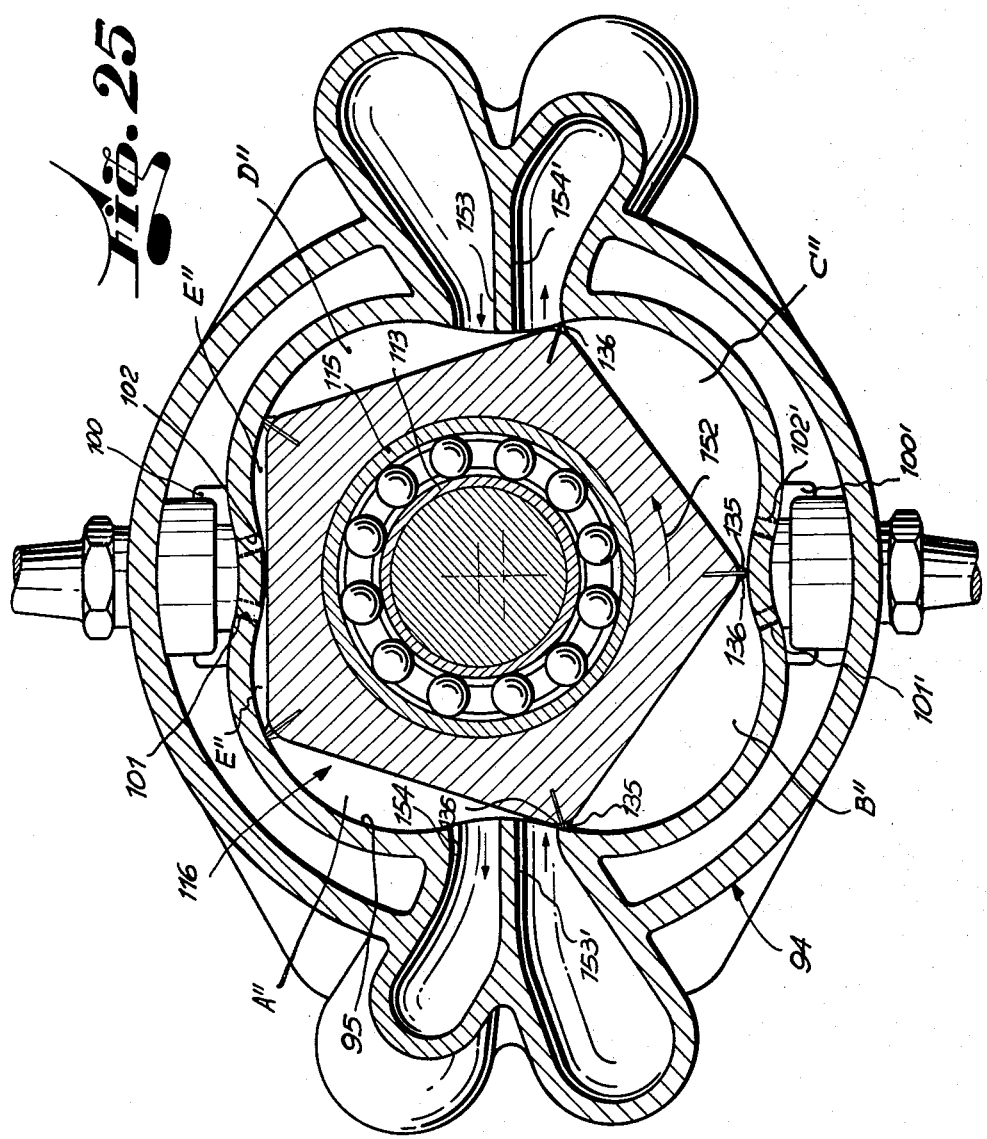

FIG. 25 is a cross section along line XXV—XXV of FIG. 24.

Figure 26:
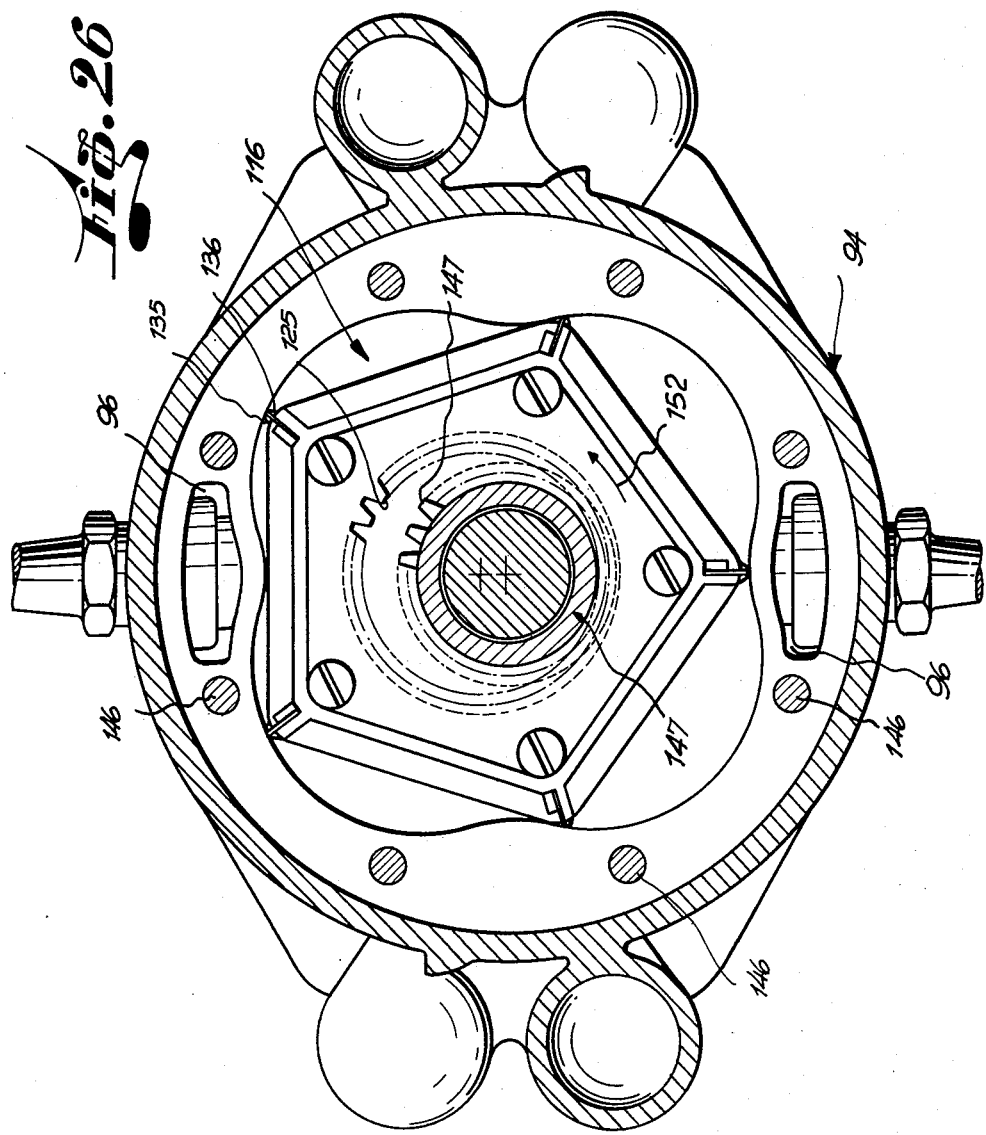

FIG. 26 is a cross section along line XXVI—XXVI of FIG. 24.

Figure 27:
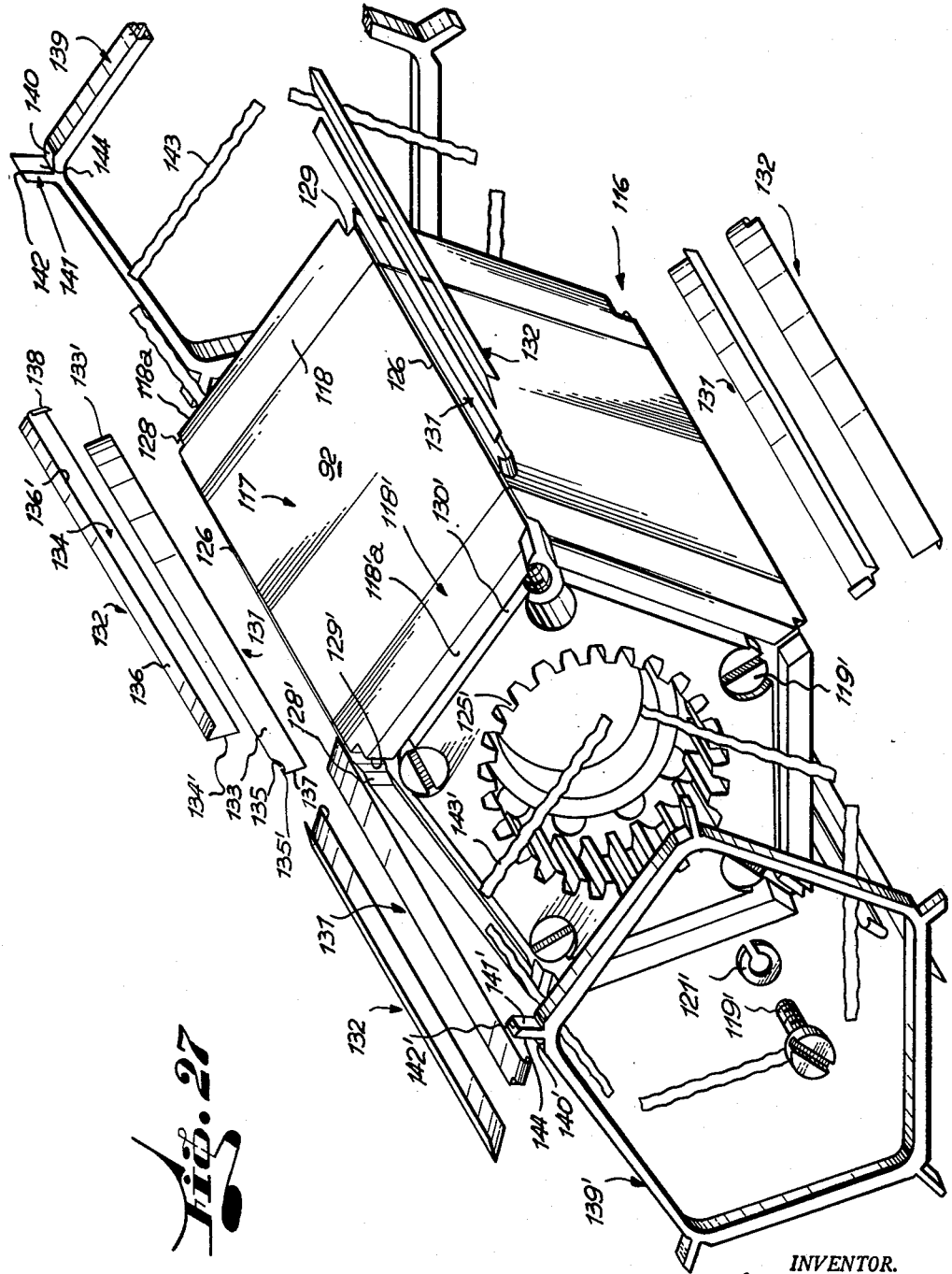

FIG. 27 is an exploded perspective view of the inner wheel or rotor and accessories of the structural embodiment of FIG. 24.

Figure 28:
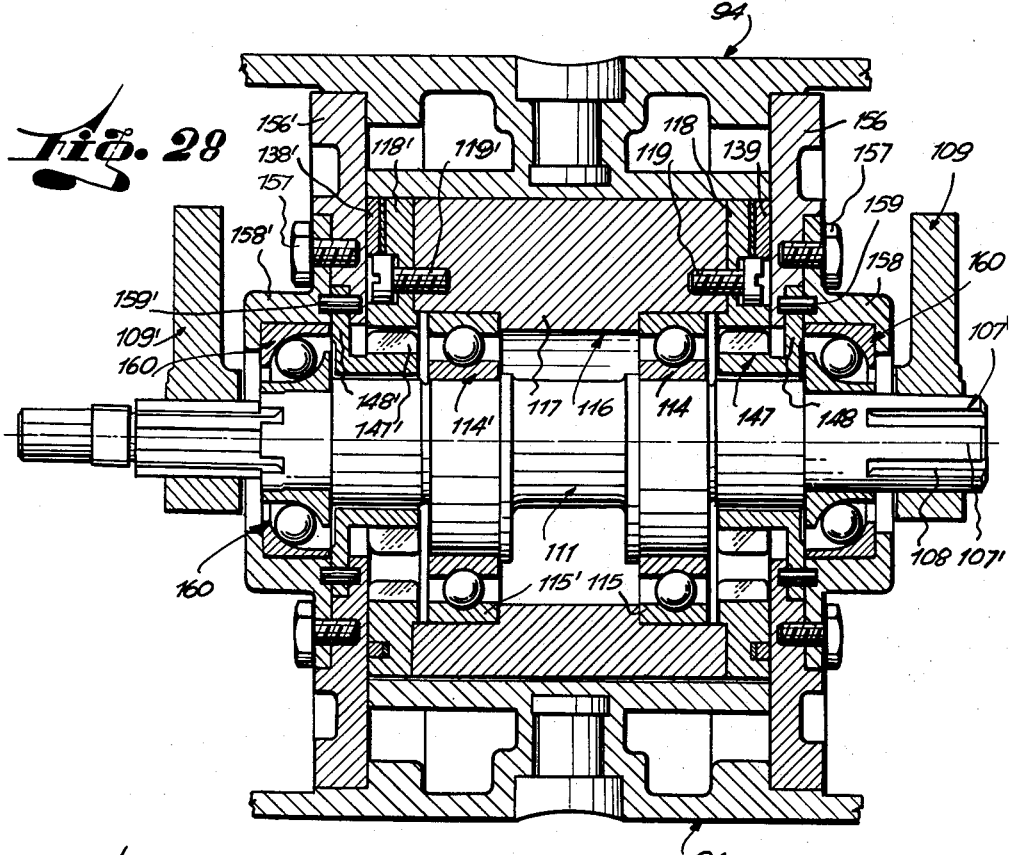

FIG. 28 is a longitudinal section similar to FIG. 24 of a modified structural embodiment with regard to that disclosed in FIG. 24.

Figure 29:
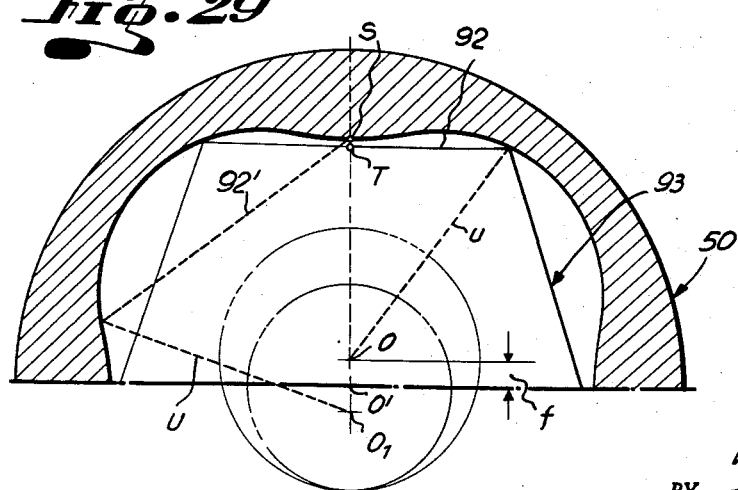

FIG. 29 is a geometrical lay-out of a portion of the machine which enables the explanation of the law which is to be followed in order that the internal wheel may have straight side faces.

FIG. 30 is a longitudinal section of an alternative arrangement of a special spark plug to be used in the machine when operating as an engine.

FIG. 31 is a lay-out of a pair of meshing wheels of the curtate cardoid type.

A number of very interesting rotary machines may be designed comprising a housing which defines, or in which is housed an inwardly directed ring gear, within which a pinion or rotor is located which eccentrically meshes with said inwardly directed ring gear to define between said ring gear and said pinion spaced and sealed apart chambers which, upon the arrangement enter operation, which may be performed in different ways, will vary in volume and move so that either power may be generated or work may be performed, as the case may be.

The expression "inwardly directed ring gear" merely defines the fact that the teeth of the gear are directed towards a centre or a central portion, although the ring gear as such may be based on different concepts, as will be later understood.

In view of the foregoing it seems to be more adequate to call the ring gear and the pinion or rotor simply "wheels" and to state that the machine consists of a pair of wheels one within the other and the shape of the gear teeth of both wheels is such that they are capable of establishing reciprocal or mutual meshing contacts defined by cycloids which are capable of always defining a well determined number of contact points establishing the mesh between the inner wheel and the outer wheel and thus dividing the spaces existing therebetween in a number of well defined chambers, the volume of which vary upon rotating either or both of the wheels.

The machine of the present invention may be operated in three different manners:

A. By rotating simultaneously both wheels, in which event each wheel will rotate about its own rotary axis which axes are kept stationary.

B. By maintaining the inner wheel or pinion stationary, that is to say without rotation, and eccentrically rotating the outer wheel, that is to say, the inwardly directed rotating ring gear, thereabout, whereby the outer wheel will rotate about its axis of rotation and said axis of rotation will in turn rotate about the stationary axis of the inner wheel.

C. By maintaining stationary the outer wheel and rotating eccentrically therewithin the inner wheel, or in other words, the inner wheel will rotate about its axis of rotation and said axis of rotation will in turn move around the stationary axis of rotation of the outer wheel; in other words, the last suggestion is the opposite proposition to the foregoing second suggestion (B).

Since the outer wheel defines the housing or is housed within such a carcass, it is obvious that such a housing will have the necessary side walls to define the above mentioned chambers.

In order to see which type of pair of wheels combine and may be developed, it is first necessary to study the properties of the cycloid curves.

As it is known, a cycloid is a curve traced by a point on the radius (prolonged if necessary) of a circle rolling on a plane along a line in the plane. If it is desired to apply this concept to wheels, the line in the plane is a circle, and thus it is possible to generate an epicycloid which, as is known, is a curve traced by a point of a circle that rolls on the outside of a fixed circle. When the circle rolls inside the fixed circle the curve described is called an hypocycloid. Furthermore as is well known, the curve traced by a point on the radius (or radius prolonged) of a rolling circle, but not on the rolling circle is known as an epitrochoid or an hypotrochoid according as the circle rolls on the outside or on the inside of the fixed circle. All such curves are called roulettes or trochoids.

Dealing now in particular with FIG. 1, it will be appreciated that if circle A, hereinafter called the generating circle, rotates on the outside of the fixed circle B and if the generating point is located on the circumference of the generating circle A, such a point C generates a true epicycloid curve $c$ and this point C will be called epicycloid generating point. If, on the other hand, the generating point D is located on the prolonged radius R (shown in dotted lines) and therefore point D may be called a curtate generating point, the resulting curve will be curve $d$ which is a curtate-epitrochoid curve which will generate loops (only half of which is shown). Finally if the generating point, such as point E is located on the radius R, but between the circumference of the generating circle A and its center O, which, in other words, is a prolate generating point E, then the resulting curve $e$ is a prolate-epitrochoid curve.

As is known, the true epicycloid curve $c$ defines sharp point C'' on the fixed circle B. The curtate epitrochoid curve $d$ defines loops $d''$ crossing the fixed circle B and the prolate-epitrochoid curve $e$ is of a wavy shape which is outside the fixed circle B.

The same concepts are true for the curves shown in FIG. 2 where the generating circle A' rolls inside the fixed circle B, whereby the generating point C' will define a true hypocycloid curve $c'$, the curtate generating point D' will generate a curtate hypotrochoid curve $d'$, and the prolate generating point E' will generate the prolate-hypotrochoid curve $e'$. As may be seen in FIG. 2, similarly as in FIG. 1, the true hypocycloid curve $c'$ defines sharp points on the fixed circle B, the curtate hypotrochoid curve $d'$ defines loops crossing the fixed circle B and the prolate hypotrochoid curve $e'$ is of a wavy shape without touching the fixed circle B.

Furthermore the curves may be classified according to the size of the generating circle with regard to the fixed circle. If, as shown in FIG. 3 the fixed circle B has a radius $R=+1$, when the generating circle is varied starting from 0 increasing until $+1$, hypocyclic curves will be obtained. If $R=0$, the curves will be reduced to a point which is the generating point and likewise if $R=+1$ the resulting curve will likewise be reduced to a point which coincides with the generating points.

The generating circles F and G are generating circles which would define hypocycloids of different sizes and are within the limit of $R=0$ and $R=+1$.

If the radius R is increased in positive values so as to define the generating circles H, I, J then opposite epicycloids will be obtained. The limit case would be when $R=+1$ which would define a point coinciding with a generating point and $R=\infty$ where the curve will be an involute or evolvent.

This last case would be defined by the straight line K.

If the radius is still further varied from $\infty$ to 0 by negative values such as curves L, M, N, P, Q defining respective generating circles, epicycloids would be obtained, the limit case of which is the evolvent K where $R=\infty$ and the other limit case would be when the generating circle is just a point, where $R=0$.

Furthermore, it is characteristic of the cycloids generated by generating points on the generating circle, i.e., common cycloids, that the resulting cycloid curves of complementary cycloids are equal to the first mentioned cycloids provided that the sum of the radii of the complementary cycloids is equal in quantity and sign to the radius of the fixed circle. In other words, if for instance two hypocycloids are generated by generating circles, the radii of which are respectively .3 and .7, whereby the sum thereof is equal to the radius of the fixed circle which as previously stated is $R=1$, the two resulting hypocycloids are of identical shape. Similarly, two epicycloids generated by generating radii $=-.3$ and $+1.3$, will likewise be identical.

Bearing in mind the foregoing, it will be appreciated that in FIGS. 4 and 5, cycloids are shown which are complementary to those disclosed in FIGS. 1 and 2.

More particularly, FIG. 4 shows the opposite epicycloids generated by the same points C, D, E of FIG. 1 which now are complementary epicycloids. Thus the epicycloid $c_1$ is equal to the epicycloid $c$, but the curtate epitrochoid curve $d_1$ is not equal to the curtate-epitrochoid curve $d$ and the prolate epitrochoid curve $e_1$ is not equal to the prolate epitrochoid curve $e$.

In FIG. 5 the same comments are applicable by comparing FIG. 2 with FIG. 5 and more particularly the hypocycloids of FIG. 5 are generated by the same generating points C', D', E' but now on the complementary generating circle so that the true hypocycloid curve $c'_1$ is equal to $c'$, but the curtate hypotrochoid curve $d'_1$ is not equal to $d'$ and the prolate-hypotrochoid curve $e'_1$ is not equal to $e'$.

If it is now desired to make use of the above concepts for a machine having a pair of complementary wheels as above stated using cycloids for the teeth, a number of particular geometrical conditions must be fulfilled. More particularly, the two fixed circles must be tangent, and the same generating circle must be used for both, so that the shape of the resulting teeth is reciprocal and in order that they mesh as required, the following additional conditions are necessary:

(1) It is necessary that the radius of the generating circle or of its complement to an integer submultiple of each of the fixed circles since if not, no endless curve would be achieved, because the beginning and the end of the generated curve would not coincide.

(2) It is necessary that the difference between the diameters of the fixed circles be equal to the diameter of the generating circle. In other words, if the diameter of one of the fixed circles is $n$ and $n$ is an integer number, and the diameter of the generating circle is 1, the diameter of the other fixed circle can only be $n+1$ or $n-1$.

(3) The height of the resulting two generated teeth, which is the height of one integer radially considered cycloid, must be equal to the diameter of the generating circle or its complement.

(4) It is not possible to use cycloids having a loop.

From the foregoing it will be apparent to those skilled in the art, that the different possibilities of carrying out the invention for designing the reciprocal meshing teeth and even the selection of the diameters of the fixed circles is rather limited, since both diameters must be integers and successive multiples of a magnitude or value which is the diameter of the generating circle of the epicycloids or hypocycloids or the complements thereof. If the diameter of the generating circle or its complement is considered to be the unity or in other words 1, the diameters of the two fixed circles may for instance be 1 and 2, or 2 and 3, or 3 and 4, or 4 and 5, etc.

Turning now to FIG. 6, wherein a pair of fixed circles 1 and 2 which are tangent at point 3 are shown, there are only four possible generating circles to fulfil the above conditions. Generating circle 4 which is, so to say, internal to the point of tangency 3; generating circle 5 which is external to the point of tangency 3; generating circle 6 which is complementary to the generating circle 4 with regard to the larger fixed circle 2 and is therefore equal to the smaller fixed circle 1; and finally generating circle 7 which is complementary to the generating circle 5 with regard to the smaller fixed circle 1 and is therefore equal to the larger fixed circle 2.

Circle 8 having the same diameter as generating circles 4 and 5 is only shown to demonstrate that the difference in diameters between the fixed circles 1 and 2 is equal to the diameter of the generating circle.

From the foregoing it is apparent that for the present invention, for each pair of tangent fixed circles only four different generating circles may be used.

It is now to be seen which combinations are possible with regard to the embodiments explained in relation to FIG. 6, bearing in mind that the generating points may be those generating common cycloids or trochoids.

The term "tooth" or "teeth" is to be interpreted as the either outwardly or inwardly projecting portion of the curve which in some instances is a cusp, such as in the first cases which will now be analyzed.

In first instance, the possible cases shall be analyzed when the generating point is on the generating circle to obtain the common cycloids.

The epicycloids generated by the generating circles 5 and 7 on the fixed circle 1 are equal amongst themselves and the hypocycloids generated by the generating circles 4 and 6 on the fixed circle 2 are equal amongst themselves and the shape of the conjugated teeth of one are likewise conjugated of the other.

The term "conjugated" indicates that the resulting shape of teeth is such that they are meshable.

Thus, the shape of teeth of the epicycloid generated by the generating circle 5 on the fixed circle 1 will likewise be the epicycloid generated by the generating circle 7 on the same fixed circle 1 and furthermore what is generated by the generating circle 7 on the fixed circle 2 is a determined number of points which are capable of meshing or sliding along the previously mentioned epicycloid.

Similarly, the hypocycloids generated on the fixed circle 2 by the generating circle 4 will likewise be the generated hypocycloid by the generating circle 6 on the fixed circle 2 which will mesh or slide over a determined number of points on the fixed circle 1 which are generated by the generating circle 6 on the same, which is fixed circle 1.

More particularly, the above possibilties, physically expressed by means of the accompanying drawings, are as follows:

Prior to analyzing said possibilities it is to be pointed out that in the examples of FIGS. 7 to 16 the meshing wheels have always four and five teeth, although any other appropriate relationship may be adopted, as long as the conditions 1 to 4 are complied with.

I. In FIG. 7 a pair of integer epicycloids 9 and 10 is shown, as generated on the fixed circles 11 and 12, respectively. For identifying purposes, fixed circle 11 will be called "smaller diameter fixed circle" and fixed circle 12 will be called "larger diameter fixed circle." In other words, in comparison with FIG. 6, the epicycloid 9 would be generated by generating circle 5 (identified in FIG. 7 as generating circle 5) on fixed circle 1 and the epicycloid 10 would be generated by generating circle 5 on fixed circle 2.

II. The same FIG. 7 can be considered as representing an integer epicycloid 9 generated by the larger fixed circle 12, in which case the outer epicycloid is reduced to a number of points 13 in permanent contact with the epicycloid 9. Instead of linking points 13 by means of the epicycloid 14 it would likewise be possible to link said points 13 with any other kind of line, provided that it does not interfere with the epicycloid 9.

III. The same concept as explained with regard to FIG. 7, in relationship with the epicycloids of case I is shown in FIG. 8, where a pair of integer hypocycloids 15, 16 are respectively generated on the fixed circles 17 and 18, by the generating circle 4' which is the equivalent of generating circle 4 of FIG. 6.

IV. The same FIG. 8, similarly as explained in relationship with the epicycloids of case II, can be considered as representing an integer hypocycloid 16 generated as in case III by the larger fixed circle 18 in which case the inner hypocycloid is reduced to a number of points 19 in permanent contact with said hypocycloid 16. Instead of linking contact points 19 by means of the hypocycloid 15 it would likewise be possible to link said points 19 with any other kind of line, provided that it does not interfere with the hypocycloid 16.

V. FIG. 9 shows an embodiment of mixed successive hypocycloids and epicycloids on both fixed circles 20 and 21. In this case the sum of the diameters of the generating circles 22 and 23 is equal to the diameter of either of the generating circles 4 or 5 (FIG. 6).

In all the above cases I to V a perfect meshing is achieved between the two "wheels" so that the chambers defined between the respective contact points are substantially sealed from each other and upon rotating the two wheels in any of the three different manners explained under A, B and C the volume of those chambers will change but the chambers as such always exist. This is likewise true for case V in view of the fact that the hypocycloid sector 27 of the larger diameter fixed circle 21 are conjugated with the epicycloid sector 24 of the smaller diameter fixed circle 20, because both are generated by identical generating circles respectively complementary to generating circles 22, 23.

If the possible meshing of pair of wheels is considered now in relationship with curtate cycloids, then there is no possibility of designing a mixed embodiment of the type of FIG. 9 because the condition of reciprocity or mutual meshing contact does not exist. Therefore the number of possibilities is already reduced.

VI. A first possible curtate cycloid embodiment would be a pair of integer curtate hypotrochoid curves which would be generated by generating circle 4 (see FIG. 6) on both fixed circles 1 and 2. In other words both resulting curves would be of the type of curve $d'$ of FIG. 2. Thus, both curves would be of the loop type and therefore are not suitable for designing two meshing wheels.

VII. A second possible curtate cycloid would be a pair of integer curtate epitrochoid curves which would be generated by generating circle 5 (see FIG. 6) on both fixed circles 1 and 2. In other words, both resulting curves would be of the type of curve $d$ of FIG. 1. Thus both curves would be of the loop type and therefore are not suitable for designing two meshing wheels.

VIII. A third possible curtate cycloid embodiment would be, as shown in FIG. 10, an integer curtate hypotrochoid curve 28 generated by the generating circle 31, which is likewise the smaller diameter fixed circle on the larger diameter fixed circle 29. The curtate hypotrochoid 28 is a curve which is similar to that explained in relationship with FIG. 6, where the generating circle 6 rotates on the larger diameter fixed circle 2, to generate a curve of the type of $d'_1$, as shown in FIG. 5. The contact points 30 are defined by circle 31, bearing in mind that they define a curtate hypotrochoid or, in other words, that the contact points are traced by a point on the prolonged radius of the generating or rolling circle which in this embodiment is circle 31. The contact points 30 may be linked together by any type of line as long as it does not interfere with the curtate hypotrochoid 28.

IX. A fourth possible curtate cycloid embodiment would be, as shown in FIG. 11, an integer curtate epitrochoid curve 32 generated by the generating circle 35 which is likewise the larger diameter fixed circle on the smaller diameter fixed circle 33. The curtate epitrochoid 32 is a curve which is similar to that explained in relationship with FIG. 6, where the generating circle 7 rotates on the smaller diameter fixed circle 1, to generate a curve of the type of $e_1$, as shown in FIG. 4. The contact points 34 are defined by circle 35, bearing in mind that they define a curtate epitrochoid, or in other words, that the contact points are traced by a point on the prolonged radius of the generating or rolling circle which in this embodiment is circle 35. The contact points 34 may be linked together by any type of line, as long as it does not interfere with the curtate epitrochoid 32.

If the possible meshing of pair of wheels is considered now in relationship with prolate cycloids, then there is likewise no possibility of designing a mixed embodiment of the type of FIG. 9, because the condition of reciprocity or mutual meshing contact does not exit. Therefore the number of possibilities is likewise reduced.

X. A first possible prolate cycloid embodiment would be a pair of integer prolate hypotrochoid curves which would be generated by generating circle 4 (see FIG. 6) on both fixed circles 1 and 2. In other words, both resulting curves would be of the type of curve $e'$ of FIG. 2 and more particularly correspond to the curves 36 and 37 of FIG. 12 which are not suitable because the height of the teeth is not equal to the modules. The fixed circles have again been identified with reference numerals 1 and 2 and the generating circle with reference numeral 4, similar as in FIG. 6.

XI. A second possible prolate cycloid embodiment would be a pair of integer prolate epitrochoid curves which would be generated by generating circle 5 (see FIGS. 6 and 13) on both fixed circles 1 and 2. In other words, both resulting curves would be of the type of curve $e$ of FIG. 1 and more particularly correspond to the curves 38 and 39 of FIG. 13, which are not suitable because the height of the teeth is not equal to the module. (In general, the module is defined as the pitch diameter divided by the number of teeth; it is the reciprocal of the diameter pitch. In the instant case, the module means the ratio between the diameter of the fixed circle and the number of teeth. Taking for instance, FIG. 13 of the drawings, it will be appreciated that the upper portion of curve 38 meshes with the upper portions of curve 39, but in the remainder of these curves, the inner wheel does not mesh with the outer wheel thereby producing only two chambers. This is not what is required bearing in mind that the outer wheel has five teeth and the inner wheel four teeth, and that therefore there should be at least four chambers. The same concept, of course, may be applied to FIG. 12.)

XII. A third possible prolate cycloid embodiment would be an integer prolate hypotrochoid curve generated by generating circle 6 on fixed circle 2 (FIG. 6) to achieve a curve of the type of $e'_1$, as shown in FIG. 5, which would be a looped curve. The complement thereto would be defined by contact points of fixed circle 1 which is likewise the generating circle 6, bearing in mind that they define a prolate hypotrochoid or, in other words, that the contact points are traced by a point on the radius between the circumference and the center of fixed circle 1. This embodiment is not suitable in view of the loops above mentioned.

XIII. A fourth possible prolate cycloid embodiment would be an integer prolate epitrochoid curve generated by generating circle 7 on fixed circle 1 (FIG. 6) to achieve a curve of the type $d_1$ as shown in FIG. 4, which would be a looped curve. The complement thereto would be defined by contact points of fixed circle 2 which is likewise generating circle 7 bearing in mind that they define a prolate epitrochoid or, in other words, that the contact points are traced by a point on the radius between the circumference and the center of fixed circle 2. This embodiment is not suitable in view of the loops above mentioned.

Bearing in mind the above possible combinations defined by cases I to XIII, it will be appreciated that for the purpose of this invention cases VI, VII, XII and XIII cannot be used in view of the loops. Furthermore cases X and XI cannot be used in view of the fact that the module does not coincide with the height of the teeth.

Bearing in mind that cases I and II are equivalents and likewise III and IV are equivalents, it may be stated that there are five different cases which are as such suitable for the purpose of the present invention and more particularly cases I, III, V, VIII and IX.

From the point of view of the sealing properties which the meshing points of the two meshing wheels have to supply, so that the different chambers are sealed off from each other, those cases are preferred where one of the curves defining one of the two wheels are replaced by contact points, i.e., I, III, VIII and IX.

So as to facilitate the comprehension of how, for instance, the above cases VIII and IX would be developed into pertinent embodiments, reference is now made to FIGS. 14 to 17.

More particularly, in FIG. 14 the inner wheel 40 is defined by a curtate hypotrochoid of the type of curve 28 of FIG. 10 and the outer wheel 41 comprises inwardly projecting teeth 42 having the contact points 43 which would correspond to the contact points 30 of FIG. 10, and therefore actually correspond to case VIII.

FIG. 15 suggests an embodiment where the same curves and points as in FIG. 14 are used, but where the curtate hypotrochoid 44 is materialized by the outer wheel 45, while the contact points 46 are materialized on the outwardly projecting teeth 47 integral with a central circular rotor 48, thus defining the inner wheel 49 and therefore likewise corresponds to case VIII.

In FIG. 16 the outer wheel 50 materializes the curtate epitrochoir curve 32 of FIG. 11 and the inner wheel 51 defines the contact points 52 and therefore corresponds to case IX.

Finally FIG. 17 materializes the curtate epitrochoid curve by means of the inner wheel 52 and the contact points 53 are materialized by the inwardly projecting teeth 54 of the outer wheel 55 and therefore likewise corresponds to case IX.

In order to achieve a good sealing effect separating the different chambers which have all been identified in FIG. 14 to 17 by reference CH, it may be advisable to provide the pertinent portions with resilient sealing strips such as schematically shown in dotted lines in FIG. 16 and identified by reference numeral 56.

Although in FIG. 16 each sealing strip is simply shown as a single resilient member 56, it may be advisable to house in each slot a pair of adjacent resilient sealing strips and a preferred embodiment thereof will be fully explained when reference is made to the preferred structural embodiment of FIGS. 24 to 27.

It is worthwhile to consider a further possibility which probably will only be suitable for pumps and compressors and perhaps two stroke engines where the outer wheel comprises only a single tooth, which consequently will operate with an inner wheel of two teeth, defined by contact points. This case is mainly described to show that it is possible to obtain a limit case.

In FIG. 31 a larger diameter fixed circle 166 and a smaller diameter fixed circle 167 are shown, wherein the larger diameter fixed circle 166 acts likewise as a generating circle on the smaller diameter fixed circle 167 with a curtate generating point 168. Since the resulting curve has only a single tooth, said curve, which is an integer curve could be defined as a one tooth curtate epitrochoid 169 or likewise a curtate cardioid.

The generating point 168 will define point 168' at 180° with regard to point 168. By linking contact points 168 and 168' such as by lines 170 and 170' an inner wheel 171 is produced, which is furthermore shown, in dotted lines in two additional positions 171a and 171b. The curtate cardioid is materialized by the outer wheel 172.

Thus it can be seen, that by rotating one or both of wheels 171 and/or 172, two chambers CH are always obtained, which vary in volume.

Having thus analyzed the different possibilities of the two wheels as far as the design of the curves is concerned and bearing furthermore in mind the three different manners according to which the machine may be operated and which have been analyzed under A, B and C it is obvious that the machine will require certain additional means depending whether it shall operate as a prime-mover, a pump or the like.

In any event, the machine must have within its housing at least one inlet port and one outlet port. The number of ports depends on the number of teeth of the wheels, on the type of movement (cases A, B, C) and on the fact whether the machine operates as an engine, pump or compressor.

For instance, in the case of the embodiment of FIG. 16, if the machine will operate somewhat as a four stroke engine and provided that the inner wheel rotates in the direction of the arrow 61, with the outer wheel being stationary, it will have a pair of air inlet ports 57 and a pair of exhaust gas outlet ports 58 which are diametrically and symmetrically opposed and arranged within the teeth 59 and 60. Furthermore, the machine may have fuel injector nozzles 62 and ignition means 63, or the fuel mixture may be supplied, duly previously carburized, directly to the inlet ports 57, or as an alternative the injector nozzles 62 may be housed in said inlet ports 57, and the necessary air passing around said nozzles into the chambers, as will be apparent to those skilled in the art.

If the inwardly projecting teeth 64 and 65 are likewise provided with pairs of ports, then the arrangement may operate as a pump or as a compressor, in which event obviously the injection means 62 and the ignition means 63 are not necessary.

In all the cases the outer wheel 50 and inner wheel 51 are housed in a suitable housing (not shown).

When FIG. 24 and following will be analyzed, reference will again be made to the embodiment of FIG. 16, so that it is considered that for the time being it is not necessary to enter into more details thereabout.

So as to analyze the possibilities as explained under A and case V, reference will now be made to FIGS. 18 to 21 which are based on the same principle as FIG. 9.

In this embodiment the inner wheel 66 consists of two teeth wherein the projecting portions 67 are epicycloids described by the generating circle 68 rolling on the fixed circle 69 (only shown in FIG. 18); the corresponding roots or recessed portions 70 of the outer wheel 71 are likewise epicycloids described by generating circle 68 rolling on the fixed circle 72 (also only shown in dotted lines in FIG. 18). The inwardly projecting portion 73 of the outer wheel 71 is conjugated to the projecting portion 67 of the inner wheel 66.

Finally the recessed portions 74 of the inner wheel 66 are conjugated with the projecting portion 73 of the outer wheel 71, as will be apparent to those skilled in the art, in view of the explanation given in connection with FIG. 9.

Thus, upon rotating either or both the inner wheel 66 as well as the outer wheel 71 which in this embodiment may likewise be called the pinion 66 and the ring gear 71, the projecting portions 67 are always in sealing contact and therefore meshing with the ring gear 71, so as to define usually in this embodiment three chambers A', B', C' (see FIG. 19), although in the particular position of FIG. 18 only two chambers A' and C' exist, since this is a limit position, wherein one of the three chambers practically disappears.

By comparing FIGS. 18 to 21, it will be appreciated that the sealing contact for defining and separating the chambers A' to C' is always maintained.

If the machine operates by rotating simultaneously the ring gear 71 and the pinion 66, each about its respective axis 75 and 76, then the embodiment as shown in FIG. 22 may for instance be used, wherein the axis 76 defines shaft 77 rotatably supporting the pinion 66, and axis 75 defines shaft 78 rotatably supporting the ring gear 71 having in this schematic embodiment a side wall 79 to laterally surround thereby from one side the pinion 66, while the opposite side is closed by a stationary cover plate 80 which journals shaft 77, while shaft 78 is journaled by schematically indicated bearing 81. Thus, walls 79 and 80 define the sides of chambers A' to C'. The rollers 82 (see FIGS. 18, 19, not visible in FIG. 22) are arranged on the periphery 71' (see also FIG. 22) of the ring gear 71. If the bearing 81 is duplicated to fully support ring gear 71, then the rollers 82 may be disposed off, inasmuch as it is important to maintain the ring gear 71 in proper rotary position.

Obviously the rollers 82 are not necessary in case shaft 77 and pinion 66 are kept stationary, in which event the ring gear 71 will eccentrically rotate about the stationary pinion 66, and in that event, bearing 81 (see FIG. 22) will be replaced for instance by suitable cam means (not shown) for properly guiding shaft 78.

If, on the other hand, the ring gear 71 is kept stationary and the pinion 66 eccentrically rotates within the stationary ring gear 71, then the stationary side plate 80 could be replaced for instance by a sliding side plate (not shown) so that it operates as a cam for shaft 77.

If the machine operates as a pump or compressor, then assuming with regard to FIG. 23 that the machine rotates in the direction indicated by arrow 83, the left hand side dotted opening 84 represents the outlet port and the right hand side opening 85, likewise shown in dotted lines, would represent the inlet port which would be arranged in the cover plate 80 shown in FIG. 22, and wherein the openings are not illustrated.

If FIG. 23 is now compared with FIG. 18 it can be appreciated that when the machine is in the position of FIG. 18, the outlet port 84 (see FIG. 23) is sealed off from the inlet port 85 which would correspond to the start position and as the machine starts to rotate by driving either one or both shafts, chamber B' (FIG. 19) starts to create a vacuum which already in FIG. 20 has opened to inlet port 85, which chamber more or less reaches its maximum opening in the position of FIG. 21.

As the rotation continues a little bit more, the position of FIG. 18 will be reached again and now chamber B' will be fully charged and ready to start the compression step. Considering now that chamber B' in FIG. 21 is chamber C' in FIG. 18 and again analyzing the sequence of FIGS. 18 to 21, chamber C' starts to be compressed a little until reaching position C' in FIG. 21, and now again returning to FIG. 18, chamber C' becomes chamber A' in FIG. 18 and will be gradually, fully compressed and the charge therein opens into the exit opening 84, as will be apparent by again comparing the sequence of FIGS. 18 to 21.

If the machine hereinbefore described is to be used as a fluid or steam expansion prime-mover, then all that is necessary is to invert the compressor cycle; in other words the machine will have to rotate in opposite direction to that indicated by arrow 83, port 84 will become the inlet port for pressurized fluid or steam and port 85, the exhaust or outlet port, as will be evident to those skilled in the art.

In case the machine is to be used as an internal combustion engine, then the admission port would be port 86 and next to it would be the exhaust port 87, as shown in full lines in FIG. 23.

In this event, it has to be borne in mind, that when the full compression condition is reached, such as shown in FIG. 18 where chamber B' practically disappears, there must be a compression chamber such as shown in dotted lines only in FIG. 20 and identified by reference numeral 88; obviously there is one compression chamber 88 arranged at the root of each tooth.

A spark plug or a constantly glowing ignition means 89 (see FIG. 23) must likewise be arranged within the space defining the moving chambers A', B', C'.

Tests carried out with this embodiment have shown that in practice, due to the fact that rather large surfaces are sometimes in sealing contact, it happens that additional chambers are formed therebetween for short periods which is of course not suitable. Therefore the conclusion has been reached that from a practical viewpoint it is more advisable to use an embodiment of the type of those cases where one of the two wheels are defined by contact points to overcome the above mentioned drawback.

Thus, a fully structurally developed embodiment has been conceived on the basis of the embodiment of FIG. 16, where the physical outer wheel 50 has four inwardly directed teeth and the physical inner wheel 51 has five teeth.

The expression "physical wheel" intends to express the mechanical lay-out or physical position of the wheels although, actually the five teeth wheel 51 is that corresponding to the larger diameter fixed circle and wheel 50 of the four teeth corresponds to the smaller diameter fixed circle, so that strange as it may be, the larger diameter fixed circle wheel is located within the smaller diameter fixed circle wheel.

The relationship of four and five teeth is the most suitable one, although it would obviously be possible to have a larger number of teeth and also smaller number of teeth down to the limit case of one and two teeth, as previously explained in connection with FIG. 31.

In the embodiment of FIG. 16 the contact points 52 are linked together by slightly concave side faces 90 which is necessary to avoid that said side faces will butt or interfere during operation with the inwardly directed teeth 91. It is now assumed that the outer wheel 50 remains stationary and the inner wheel 51 performs the rotation.

From the practical viewpoint, in order to reduce manufacturing cost, it would however be advisable that the concave side faces 90 are straight side faces 92, such as shown in the structural embodiment of FIGS. 24 to 27 (see particularly FIG. 27).

In order to achieve such a result, reference is now made to FIG. 29 wherein the outer wheel or ring gear is again identified by reference numeral 50 and is of identical structure to that shown in FIG. 16.

The inner wheel or rotor 93 has straight faces 92. The center of rotation of the inner wheel or rotor 93 is identified by O. The geometrical center of the outer wheel or ring gear 50 is identified by O'.

In order that the side faces 92 of the rotor 93 may be straight, it is necessary that the segment $\overline{OS}$ is equal or a little larger than the segment $\overline{OT}$. As a limit case it may be considered that $\overline{OS}=\overline{OT}$.

The segment $\overline{OV}$ is the radius of the circumference circumscribing the pentagon defining the rotor 93. Segment $\overline{OV}$ is hereinafter directly identified by U. $f$ defines the eccentricity of $\overline{OO'}$. Thus $$\overline{OT}=U\cos 36°=0.808U$$

furthermore $$\overline{OS}=\overline{O'S}-f=(U-f)-f=U-2f$$

wherefrom $$U=10.42f$$

If U is larger than 10.42$f$, then the faces may be straight or convex depending on the particular requirements, such as the compression relationship. If U is smaller, the side faces 92 necessarily have to be concave.

In practice U will be a little larger than 10.42$f$ in order to avoid that the straight faces 92 enter in frictional contact with the outer wheel or ring gear, i.e., that points S and T enter in frictional engagement.

The dotted line identified by 92' represents again the side face 92 when turned through such an extent that its end portion which would correspond to point V, coincides with point T. In that event the following may be stated:

$$\overline{OO'}=\overline{O'O_1}=f$$

$$\overline{O'S}=\overline{O_1S}-f$$

thus $$\overline{O_1S}=U$$

whereby it has been demonstrated that the straight face can rotate without establishing the last mentioned frictional engagement.

The above formula that $U=10.42$ which is only applicable to a pentagon, may be expressed in generic terms for all type of regular polygon rotors where the side faces should be straight faces.

In fact:

$$U-2f \geq U\cos\frac{360°}{2n}$$

$$U-U\cos\frac{360°}{2n} \geq 2f$$

$$U\left(1-\cos\frac{360°}{2n}\right) \geq 2f$$

$$U \geq \frac{2f}{1-\cos\frac{360°}{2n}}$$

wherein $n$ is the number of side faces of the rotor.

Analyzing the general formula for straight side face rotors it may be stated that the condition is that the radius of the circumference circumscribing forming the regular polygon should be equal or larger than twice the eccentricity of the respective geometrical centers of the outer and inner wheels divided by one less the cosenus of 360° divided by twice the number of sides of the polygon. "Regular polygon" as used in the specification and claims is used in the broad sense to cover polygons whose sides are constituted by straight lines and polygons whose sides are curved.

It should be added that in practice it is not possible to have a triangular cross sectional rotor with straight side faces because said straight side faces would cut the inwardly directed teeth of the ring gear.

According to the embodiment of FIGS. 24 to 27 the machine is there designed to operate somewhat as a four stroke internal combustion engine, where the rotor has straight faces and the design is based on the embodiment of FIG. 16.

It should be pointed out that while the description of the embodiment of FIG. 24 is a preferred structural embodiment which shows in detail how the invention may be carried out in practice, nevertheless it would be possible to use any of the other designs or the pertinent corollaries.

As may be appreciated in FIGS. 24 to 26 the internal combustion engine comprises an outer housing 94, the inner wall 95 of which defines a four inwardly directed teeth arrangement, so that the outer housing 94 is the previously defined outer wheel or ring gear.

Said outer housing 94 comprises a pair of interconnected cooling channels 96 which are connected to a water inlet pipe 97 and a water outlet pipe 98. Furthermore, in this particular arrangement where a somewhat four stroke engine is provided and, as will be later seen, said four stroke engine comprises the equivalent of two cylinders from the structural viewpoint, a pair of oppositely arranged ignition means, such as conventional spark plugs 99 and 99', are mounted in the middle portion of said housing 94 within prechamber 100 and 100' which are connected, as best shown in FIG. 25, through a pair of channels 101, 102 and 101', 102' to the inner wall 95. The purpose of these prechambers 100, 100' will be explained later on.

The side faces of the housing are respectively closed by side plates 103, 103' fixed to said housing 94 by bolts 104, 104' as may be best seen in FIG. 24. Said plates 103, 103' have a central stepped portion 105, 105' wherein ball bearings 106, 106' are housed journalling a central shaft 107 having a splinned end portion 108 projecting out of the side plate 103 adjacent to the ball bearing 106, 106'. Within the housing, the central shaft 107 has keyed thereon respective counterweights 109, 109' which compensate the eccentric portions 110, 110', likewise integral with the central shaft 107, ball bearings 114, 114' and the eccentric mass of the rotor 116. The eccentric portions 110 and 110' are separated by the central portion 111 of the central shaft 107.

The inner races 113, 113' of a pair of ball bearings 114, 114' are journalled on the eccentric portions 110, 110'. The outer races 115, 115' rotatably support the pentagonally shaped rotor 116 (see FIGS. 25 and 26).

In this embodiment the rotor 116 actually consists of three portions as may be best seen in FIGS. 24 and 27, although if desired the rotor may be made of a single piece.

The reasons for manufacturing the rotor of three portions are that such an arrangement is necessary for assembling and retaining the ball bearings 114 and 114', as well as the fact that the central portion 117 may be made of cheaper metal than the end portions 118 and 118' which have to be machined in a rather complicated manner in order to achieve the necessary sealings, as will be now explained.

The end portions 118, 118' are linked to the central portion 117 by screws 119 and 119' the heads of which are mounted in recesses 120 and 120' with the interposition of split washers 121, 121'.

While the central portion 117 simply defines a central bore 122 with stepped end portions 123 and 123' (FIG. 24) wherein the portion of the outer races 115, 115', respectively, are located, the end portions 118 and 118' besides of having likewise inner stepped portions 124 and 124' respectively, further comprise each an inwardly directed ring gear 125, 125' (see also FIG. 27), the purpose of which will be later on explained.

Since the screws 119 and 119' retain the end portions 118 and 118' on the central portion 117, the inner stepped portions 124 and 124' together with the stepped end portions 123 and 123' retain the outer races 115 and 115'. Thus, the rotor 116 is retained on the eccentric portions 110, 110' of the central shaft 107, and it may already be appreciated that the rotor 116 eccentrically rotates about the axis 107' of shaft 107.

Since the rotary edges defined by the apices of the rotor 116 have to be in sealing contact with the inner wall 95, it is advisable that the body portion corresponding to the rotary generatrices of the rotor are provided with resilient sealing means, similar to piston rings of a piston engine.

For this purpose sealing strips of various shapes may be disposed in slots made along the last mentioned edges. In order to obtain a better sealing effect, it is advisable that pairs of strips are located in each slot, in order to compensate the manufacture and temperature variation clearances in the direction of longitudinal axis 107', since one of the two strips is always urged towards one end face or side plate and the other towards the opposite end face or side plate of the casing.

Furthermore, in order to achieve a correct sealing it is necessary to dispose on the opposite side faces of the rotor side sealing members or the like which will be urged towards the side plates of the casing.

The sealing strips as well as the side sealing members may be urged against the inner face of the casing by the centrifugal force, and/or by suitable elastic means and/or by the oil pressure or other similar means, as will be later on apparent to those skilled in the art.

To this end, as may be best seen in FIG. 27, the rotor 116 comprises at each generatrix a slot 126 which passes through the central portion 117 as well as the end portions 118, 118'. In the end portions, and more particularly at the front sides 118a and 118'a, said slots 126 enter into step like openings 128, 128' and 129, 129'.

It will be appreciated from FIG. 27, that one side portion defining part of the slot 126 contains respectively at each end the step-like openings 128 and 129' and the opposite side portion contains respectively at each end the step-like openings 128' and 129. Steps 128, 128' define in this structural embodiment a larger depth than steps 129, 129'.

Below the stepped openings the front faces 118a, 118'a have a pentagonal channel 130, 130' (channel 130' is visible in FIG. 27 and both channels are visible in FIG. 24).

A pair of symmetrically opposite sealing strips 131 and 132 (FIG. 27) are provided for each slot 126; each pair consisting of a substantially rectangular main body 133, 134, the respective upper portions of which are bent at an acute angle to define the upper flaps 135, and 136. The rectangular main bodies 133 and 134 have respectively opposite straight edges 133' and 134' whilst the opposite edges to said straight edges 133' and 134' are prolonged to define U-shaped wings 137, 138, both bent in the same direction as the flaps 135, 136, respectively.

The pairs of sealing strips 131, 132 are located in back to back relationship in the slots 126, so that the rear faces are in contact and the flaps 136 and 136 project out of the slots 126, as clearly shown in FIGS. 25 and 26 and the U-shaped wings 137 will be located in the spaces defined between the steps 128', and similarly the U-shaped wings 138 will be located in the spaces defined by the steps 128.

A pair of side sealing pentagonal members 139 and 139' (FIG. 27) are to be housed in the pentagonal channels 130, 130', respectively. The pair of side sealing pentagonal members 139, 139' are flattened at their apices, as identified by reference numerals 140, 140' and therefrom respective finger portions 141, 141' are projecting and ending in respective biased end faces 142, 142'. The width of each of the finger portions 141, 141' is substantially equal to the depth of the single steps 129, 129' and said finger portions 141, 141' are located, with regard to FIG. 27, on the left hand side and on the right hand side of the flattened portions 140 and 140', respectively.

Ondulated spring blades 143, 143' having a length slightly smaller than the length of the sides of the pentagonal channels 130, 130' are located in said channels and thereon the side sealing pentagonal members 139, 139' are partially housed in said channels 130, 130', whereby said members 139, 139' are resiliently outwardly urged and the fingers 141, 141' will respectively be housed in the spaces defined by the steps 129, 129'. Since the sealing strips 131 and 132 are mounted in the previously described manner in the slots 126, the edges 134' and their adjacent portions as well as the pertinent portions of the upper flaps 136 will be abutting against the rear faces 144' and biased end faces 142' of the finger portions 141' and similarly the edges 133' and their adjacent portions as well as the pertinent portion of the upper flaps 135 will be abutting against the rear faces 144 and biased end faces 142 of the finger portions 141.

Furthermore each U-shaped wing 137 will be located within the space defined by the step 128' and each U- shaped wing 138 will be located in the space defined by the step 128.

The biased end faces 142 and 142' will be located in abutting relationship below the pertinent portion of the flaps 136 and 135, respectively. The behaviour of the sealing strips 131 and 132 will be later explained.

The outer housing 94 defines the previously described cooling channels 96 which must be closed at their outside portions by means of closure plates 145, 145' (FIG. 24) which are linked to the housing 94 by bolts 146, 146'. The closure plates 145, 145' are in sealing contact with the side sealing pentagonal members 139, 139' and support each by their inner annular portions 145a and 145'a a pinion 147, 147' which to this end comprise an outwardly extending flange 148 each, bolted by means of bolts 149, 149' thereto. It will thus be apparent that the pinions 147 and 147' are stationary and eccentrically mesh with the inwardly directed ring gear 125 and 125', respectively. The pinions 147, 147' are coaxial with axis 107'.

Lubricating bores 150, 150', 150a and 150'a pass through the outer housing and colsure plates 145, 145', so that lubricating oil may be supplied through bores 150, 150' into the space defined by the pinion 147, 147' and gears 125, 125' and the lubricating oil is evacuated through bores 150a, 150'a.

For orientation purposes it may be added that the pinions 147, 147' coincide with the fixed circle of the smaller wheel.

In this particular embodiment the engine will operate somewhat as a four stroke engine.

If the engine rotates in the direction indicated by arrow 152, then the admission ports will be ports 153 and 153' and the exhaust ports will be ports 154 and 154'. Admission ports 153, 153' are connected to suitable fuel mixture supply means (not shown) preferably of the injection type, because the vaporization heat acts as a coolant for the rotor, which therefore is an important aspect of the invention. It may be advisable to use a fuel mixture containing lubricating oil, similarly as nowadays in two stroke engines.

Assuming now that the rotor 116 is in the position as shown in FIG. 25 and rotates in the direction of arrow 152, chamber A" contains gases under expansion which are being discharged through exhaust port 154; chamber B" contains a fresh supply of carburized fuel which was previously supplied through admission port 153' and is being compressed; chamber C" contains a mass of expanding gas which has been fired by spark plug 99'; chamber D" is still receiving carburized fuel through admission port 153 and chamber E" defines the moment of maximum compression of the fuel and theoretically likewise the instant in which said fuel is being fired through spark plug 99.

In view of the previous explanation it is not considered necessary to further define the actual operation of the device, since it will be obvious to those skilled in the art.

However, as to the behaviour of the structural parts it may be added that upon rotating the rotor 116 on the ball bearings 114 and 114', that the meshing of successive portions of the inwardly directed ring gears 125, 125' with the stationary pinions 147, 147' will assure that there is no tendency that the rotor itself tends to twist and in addition the eccentric movement of the rotor with regard to axis 107' is assured, so that in combination with the sealing strips 131 and 132 a good sealing effect between chambers A" to E" is achieved. In order that in the position shown in FIG. 25 a minimum of interconnecting effect between the chambers C" and B" is produced, prechambers 100, 100' are provided, to reduce the connecting space to a minimum, particularly in view of the channels 101, 102, 101', 102'.

The sealing effect of the sealing strips 131 and 132 is achieved both in radial direction as well as in parallel direction to axis 107' in view of the fact that the straight edges 133' and 134' are in abutting contact with the inside faces of the closure plates 145 and 145', while the U-shaped wings 138 and 137 are sufficiently resilient to exert an urging pressure in the direction towards the inner faces of the closure plates 145 and 145', respectively, since said U-shaped wings 138 and 137 are in abutting contact with the inner faces of the closure plates 145 and 145', respectively, thus achieving a lateral sealing effect, as far as the outer portions of the pentagonal front sides 118a and 118'a is concerned. So that the gases under expansion may not pass by said outer faces 118a and 118'a between the sealing strips, i.e., the side portions of the pentagon, the side sealing pentagonal members 139 and 139' are provided. Members 139, 139' are in frictional sealing contact, due to the urging force exerted by the ondulated spring blades 143, 143', with the inner side closure plates 145, 145'.

The upper flaps 135 and 136 by their free edges 135', 136' are in resilient contact with the pertinent portions of the straight side faces 92 adjacent to the slots 126, thereby urging the sealing strips 131 and 131' radially outwardly in contact with the inner wall 95. In a certain extent this effect is cooperated by the centrifugal force generated by the rotation of the rotor 116 and also by the biased end faces 142 and 142' of the side sealing pentagonal members 139, 139'.

On the other hand, when it becomes necessary, the sealing strips 131 and 132 and more particularly the upper flaps 135 and 136, are sufficiently resilient to be pressed down so that a true sealing action is achieved.

It will be obvious to those skilled in the art that it may be advisable to harden the inner wall 95 of the outer housing 94 to provide a longer life for the engine.

While the splined end portion 108 of shaft 107 is to be connected to a gear box or the like the opposite end 155 of shaft 107 may be connected to the accessories required for the engine, such as a lubricating pump, a water cooling pump, an ignition system (all not shown) and the like, as will be evident to those skilled in the art.

In the embodiment of FIG. 28, wherein similar parts are identified with the same reference numerals, an arrangement is shown wherein only a single pair of cover plates 156, 156' is required, although in that event the counterweights 109, 109' are mounted outside the casing 94. More particularly, shaft 107 is connected to the rotor 116 by means of the ball bearings 114, 114'. The rotor 116 comprises the central portion 117, and the end portions 118 and 118' are linked thereto by means of screws 119 and 119'. The cover plates 156 and 156' are in abutting contact by their outer annular portion with the housing 94, while their inner annular portions each support by means of bolts 157, 157' a hub member 158, 158' defining between both a space in which the pinions 147, 147' house their outwardly extending flanges 148, 148' which are retained by means of passage pins 159, 159' which are furthermore located in pertinent coaxial blind bores of the cover plates 156, 156' and hub members 158, 158'.

The ball bearings 160, 160', which are the equivalent of ball bearings 106, 106' of the embodiment of FIG. 24, are mounted on the pertinent shaft portions of shaft 107 by their inner races and since the outer races are connected to the hub portions 158, 158', the entire assembly of the cover plates 156, 156' and pinions 147, 147' is retained in proper position, with a minimum of elements.

Since the operation of this engine is substantially identical to the previously described one, it is not considered necessary to specifically describe the former.

For either structural embodiments described or any other alternative which lies within the inventive concept of the present invention, it is to be pointed out that several important aspects have to be borne in mind.

A first aspect is that the ball bearings may be replaced by friction bearings, which may be advisable for large size engines.

A second aspect is the lubricating arrangement which has already been described in the embodiment of FIG. 24 in connection with the lubricating bores 150, 150', 150a, 150'a, which may be changed or combined. or instance it could be conceived that the lubrication of the machine is obtained by forced circulation of the lubricating oil and/or in combination with the fuel injection to which lubricating oil is added, as previously explained.

A third aspect is that as far as the cooling of the housing is concerned, instead of using refrigerating water, the housing may be provided with air cooled fins.

With regard to the rotor it is advisable to provide some kind of additional refrigeration besides of the natural heat transmission towards the outside, such as by a forced circulation of cooling liquid through the hollow inner portion of the rotor, which in the previously described embodiment is carried out by the same lubricating oil.

In addition, as already previously explained, a further cooling effect may be achieved by the vaporization heat of the fuel injection on the outer face of the rotor. Whether the vaporization heat is used in combination with the inner refrigerating liquid or alone depends on the particular type of engine.

A fourth aspect is that the rotor can be made of a single piece, particularly when large size engines are used, where the mounting of the bearings for the rotor enables such a one-piece structure.

A fifth aspect is that the sealing strips instead of being mechanically urged towards the side plates, such as by U-shaped wings 137, 138, said sealing strips could be forced into sealing contact with the pertinent wall portions by means of pressure exerted by the lubricating oil.

Finally, a sixth aspect resides in avoiding the manufacture of the prechambers 100, 100' with their special channels 101, 101', 102, 102' by providing a special spark plug 162 having an outwardly projecting positive electrode 161 which is housed in a very small bore 163 as shown in FIG. 30. The negative electrode may either be directly defined by the housing or preferably by means of a threaded bushing 164 having an outwardly projecting pin 165 which defines the negative electrode mounted in the housing 94 so that adjustments and replacements of the negative electrode may be easily performed. Thus the space around the spark-plug 162 which is in connection with the chambers is reduced to a minimum.

I claim:

1. A machine of the rotary type which may be used as a power generator as well as a work performing means, comprising an outer wheel and an inner wheel which are complementary amongst themselves, one of said wheels being defined by a larger diameter fixed circle and the other of said wheels being defined by a smaller diameter fixed circle, said fixed circles are tangent at one point, said larger diameter fixed circle being larger in one unit than said smaller diameter fixed circle, said unit is an integer submultiple of each of said fixed circles, said larger diameter fixed circle being at the same time a generating circle for said smaller diameter fixed circle for generating an integer curtate-epitrochoid curve for one of said wheels, said larger diameter fixed circle defining contact points on the prolonged radius thereof corresponding to the curtate, said contact points defining a number of teeth for the other of said wheels which differs in one unit from the number of teeth of said curtate epitrochoid, the wheel having the smaller number of teeth has at least three teeth, said contact points are linked together by walls defining one of said wheels, side walls for said outer wheel to define a sealed unit, said teeth of said curtate-epitrochoid defining with said contact points a number of sealed chambers, spaced apart inlet and outlet means connecting said chambers to the outside, and at least one of said wheels is rotatable, said contact points defining the inner wheel and being linked by straight side faces defining a regular polygon of at least five sides, which must fulfill the following formula $$U \geq \frac{2f}{1 - \cos\frac{360}{2n}}$$

wherein U is the radius of the circumference circumscribing the regular polygon, f is the eccentricity existing between the centers of rotation of said fixed circles, and n is the number of side faces of said inner wheel.

2. An internal combustion engine having a housing defining an inner wall of curtate epitrochoid shape of at least four inwardly projecting teeth, a first pair of separate admission and exhaust ports ending into one of said teeth and a second pair of separate admission and exhaust ports ending in the opposite tooth and in reversed position with regard to said first pair of ports, a pair of spark plugs housed in the other two of said four teeth outside said inner wall and connected thereto, a pair of side plates linked to the end portions of said housing, a central shaft passing through said side plates, said central shaft having a pair of spaced apart eccentric portions, a rotor rotatably journalled on said eccentric portions, said rotor being of regular polygonal shape of at least five sides and having its apices in sealing contact with said inner wall, at least one inwardly directed ring gear integral with said rotor and centrically disposed with regard to the center of the polygon, at least one stationary pinion concentrically mounted on said central shaft and eccentrically meshing with said inwardly directed ring gear, and at least one counterweight on said central shaft for compensating said eccentric portions of said central shaft and rotor.

3. An internal combustion engine as claimed in claim 2, wherein said rotor has a pair of end portions, longitudinal slots through the apices entering said end portions defining there an enlarged stepped opening, a pentagonal channel in each of said end portions below said enlarged openings and connected therewith, each of said end portions further defining one of said inwardly directed ring gears, a pair of sealing strips for each slot, each sealing strip having a substantially rectangular main body integral with an upper flap bent at an acute angle with regard to said main portion and in opposite direction with regard to the other of said sealing strips, each of said main bodies further defining one straight edge at the side and at the opposite side a U-shaped wing bent in the same direction and orientated in the same direction as the corresponding flap, the U-shaped wing of each sealing strip being arranged at the opposite end with regard to said straight edge, said U-shaped wings entering partially one of said enlarged openings, said upper flaps projecting out of said rotor and are in sealing contact with said inner face of said housing, said U-shaped wings are in frictional and urging contact with said side plates, ondulated spring blades housed in said pentagonal channels, a side sealing pentagonal member for each of said pentagonal channels and in resilient contact with said ondulated spring blades, said side sealing pentagonal members having five integral finger portions projecting out of the apices of said pentagonal member into said stepped portions of said enlarged opening adjacent said U-shaped wings and entering below said upper flaps.

4. An internal combustion engine as claimed in claim 3, wherein said rotor is made of a central portion and said pair of outer portions are connected to said central portion, said pair of outer portions are made of more expensive metal than said central portion.

5. An internal combustion engine as claimed in claim 4, and further comprising ball bearings having inner and outer races, said central portion comprises a pair of spaced apart stepped end portions and said side portions each having an inner stepped portion defining with said stepped end portions housings for said outer races of said ball bearings, the inner races of which are mounted on said eccentric portions of said central shaft, said housing having a pair of interconnected cooling channels, a water inlet pipe and a water outlet pipe connected to said cooling channels, said cooling channels having an open end portion, closure plates closing said open end portions and being rigidly connected to said housing, said pinions each having an outwardly extended flange, each of said flanges being rigidly connected to said closure plates, said counterweights being divided into two counterweights each one mounted on said central shaft outside said closure plates, said side plates being connected to said housing outside said counterweights, and said side plates rotatably supporting said central shaft.

6. An internal combustion engine as claimed in claim 4, wherein one hub member is rigidly connected to each of said side plates, each of said pinions having an outwardly extended flange arranged in between said side plate and said hub member and connected thereto by a plurality of radially spaced apart passage pins passing through said flange and entering both in said side plate as well as in said hub member, a ball bearing having an outer race and an inner race, said outer race being embedded in said hub member and in abutting contact with said outwardly extending flange, said inner race being mounted on said central shaft, said counterweight being mounted outside said hub member.

7. An internal combustion engine as claimed in claim 2, wherein said rotor has a pair of end portions, longitudinal slots through the apices entering said end portions, a pair of sealing strips for each slot projecting out of said slots and entering said end portions, and lateral sealing means housed in said end portions and in sealing contact with said side plates.

8. An internal combustion engine as claimed in claim 2, comprising fuel injection means for injecting fuel containing lubricating oil into said housing and onto said rotor, so as to cool said rotor by vaporization heat of said fuel and externally lubricating said rotor by said oil.

9. A machine of the rotary type which may be used as a power generator as well as a work performing means, comprising an outer wheel and an inner wheel which are complementary amongst themselves, one of said wheels begin defined by a larger diameter fixed circle and the other of said wheels being defined by a smaller diameter fixed circle, said fixed circles are tangent at one point, said larger diameter fixed circle being larger in one unit than said smaller diameter fixed circle, said unit is an integer submultiple of each of said fixed circles, said larger diameter fixed circle being at the same time a generating circle for said smaller diameter fixed circle for generating an integer curtate-epitrochoid curve for one of said wheels, said larger diameter fixed circle defining contact points on the prolonged radius thereof corresponding to the curtate, said contact points defining a number of teeth for the other of said wheels which differs in one unit from the number of teeth of said curtate epitrochoid, the wheel having the smaller number of teeth has at least three teeth, said contact points are linked together by walls defining one of said wheels, side walls for said outer wheel to define a sealed unit, said teeth of said curtate-epitrochoid defining with said contact points a number of sealed chambers, spaced apart inlet and outlet means connecting said chamber to the outside, and at least one of said wheels is rotatable, said contact points defining the inner wheel and being linked by convex side faces defining a regular polygon of at least five sides, which must fulfill the following formula $$U \geq \frac{2f}{1-\cos\frac{360}{2n}}$$

wherein U is the radius of the circumference circumscribing the regular polygon, $f$ is the eccentricity existing between the centers of rotation of said fixed circles, and $n$ is the number of side faces of said inner wheel.

10. An internal combustion engine as claimed in claim 2, wherein said rotor of regular polygonal shape has straight sides.

11. An internal combustion engine as claimed in claim 3, wherein said side sealing pentagonal member is a single integral member.

12. An internal combustion engine as claimed in claim 3, and further comprising ball bearings having inner and outer races, said central portion comprises a pair of spaced apart stepped end portions and said side portions each having an inner stepped portion defining with said stepped end portions housings for said outer races of said ball bearings, the inner races of which are mounted on said eccentric portions of said central shaft, said housing having a pair of interconnected cooling channels, a water inlet pipe and a water outlet pipe connected to said cooling channels, said cooling channels having an open end portion, closure plates closing said open end portions and being rigidly connected to said housing, said pinions each having an outwardly extended flange, each of said flanges being rigidly connected to said closure plates, said counterweights being divided into two counterweights each one mounted on said central shaft outside said closure plates, said side plates being connected to said housing outside said counterweights, and said side plates rotatably supporting said central shaft.

13. An internal combustion engine as claimed in claim 2, wherein said rotor has pair of end portions, longitudinal slots through the apices entering said end portions, at least two sealing strips for each slot projecting out of said slots and entering said end portions, and lateral sealing means housed in said end portions and in sealing contact with said side plates.

14. An internal combustion engine having a housing carcass defining an inner wall of curtate epitrochoid shape of four inwardly projecting teeth, a first pair of separate admission and exhaust ports ending into one of said teeth and a second separate admission and exhaust ports ending in the opposite tooth and in reversed position with regard to said first pair of ports, a pair of spark plugs housed in the other two of said four teeth outside said inner wall and connected thereto, a pair of side plates linked to the end portions of said housing, a central shaft passing through said side plates, said central shaft having at least one eccentric portion, a rotor rotatably journalled on said eccentric portion, said rotor being of regular polygonal shape of at least five sides, and having its apices in sealing contact with said inner wall, at least one inwardly directed ring gear integral with said rotor and centrically disposed with regard to the center of the polygon, at least one stationary pinion concentrically mounted on said central shaft and eccentrically meshing with said inwardly directed ring gear, and at least one counterweight on said central shaft for compensating said eccentric portions of said central shaft and rotor.

15. An internal combustion engine as claimed in claim 14, wherein said rotor has a pair of end portions, longitudinal slots through the apices entering said end portions, sealing strip means for each slot projecting out of said slots and entering said end portions, and lateral sealing means housed in said end portions and in sealing contact with said side plates.

References Cited in the file of this patent

UNITED STATES PATENTS

| 1,892,217 | Moineau | Dec. 27, 1932 |
| 1,968,113 | Weaver | July 31, 1934 |
| 2,947,290 | Froede | Aug. 2, 1960 |
| 2,988,065 | Wankel et al. | June 13, 1961 |

FOREIGN PATENTS

| 566,247 | France | Nov. 20, 1923 |
| 1,059,495 | France | Nov. 10, 1953 |
| 1,125,876 | France | July 16, 1956 |
| 9,359 | Great Britain | 1915 |